(12) United States Patent
Colbath et al.

(10) Patent No.: US 7,801,838 B2
(45) Date of Patent: Sep. 21, 2010

(54) MULTIMEDIA RECOGNITION SYSTEM COMPRISING A PLURALITY OF INDEXERS CONFIGURED TO RECEIVE AND ANALYZE MULTIMEDIA DATA BASED ON TRAINING DATA AND USER AUGMENTATION RELATING TO ONE OR MORE OF A PLURALITY OF GENERATED DOCUMENTS

(75) Inventors: Sean Colbath, Cambridge, MA (US); Scott Shepard, Waltham, MA (US); Francis G. Kubala, Boston, MA (US)

(73) Assignee: Ramp Holdings, Inc., Woburn, MA (US)

( * ) Notice: Subject to any disclaimer, the term of this patent is extended or adjusted under 35 U.S.C. 154(b) by 2207 days.

(21) Appl. No.: 10/610,533

(22) Filed: Jul. 2, 2003

(65) Prior Publication Data

US 2004/0006737 A1    Jan. 8, 2004

Related U.S. Application Data

(60) Provisional application No. 60/394,064, filed on Jul. 3, 2002, provisional application No. 60/394,082, filed on Jul. 3, 2002, provisional application No. 60/419,214, filed on Oct. 17, 2002.

(51) Int. Cl.
G06F 15/18    (2006.01)
G06F 7/00    (2006.01)
G06T 7/00    (2006.01)

(52) U.S. Cl. .......................................... 706/20; 706/59
(58) Field of Classification Search .................... 706/20
See application file for complete search history.

(56) References Cited

U.S. PATENT DOCUMENTS

| | | | |
|---|---|---|---|
| 4,879,648 | A | 11/1989 | Cochran et al. |
| 4,908,866 | A | 3/1990 | Goldwasser et al. |
| 5,317,732 | A | 5/1994 | Gerlach, Jr. et al. |
| 5,404,295 | A | 4/1995 | Katz et al. |
| 5,418,716 | A | 5/1995 | Suematsu |
| 5,544,257 | A | 8/1996 | Bellegarda et al. |
| 5,559,875 | A | 9/1996 | Bieselin et al. |

(Continued)

FOREIGN PATENT DOCUMENTS

EP    0664636    7/1995

(Continued)

OTHER PUBLICATIONS

Kubala et al., Integrated Technologies FOR Indexing Spoken Language, Feb. 2000.*

(Continued)

*Primary Examiner*—Donald Sparks
*Assistant Examiner*—Nathan H Brown, Jr.
(74) *Attorney, Agent, or Firm*—Kenneth F. Kozik

(57) ABSTRACT

A system improves recognition results. The system receives multimedia data and recognizes the multimedia data based on training data to generate documents. The system receives user augmentation relating to one of the documents or new documents from a user. The system supplements the training data with the user augmentation or new documents and retrains based on the supplemented training data.

30 Claims, 11 Drawing Sheets

U.S. PATENT DOCUMENTS

| | | | |
|---|---|---|---|
| 5,572,728 | A | 11/1996 | Tada et al. |
| 5,613,032 | A | 3/1997 | Cruz et al. |
| 5,614,940 | A | 3/1997 | Cobbley et al. |
| 5,684,924 | A | 11/1997 | Stanley et al. |
| 5,715,367 | A | 2/1998 | Gillick et al. |
| 5,752,021 | A | 5/1998 | Nakatsuyama et al. |
| 5,757,960 | A | 5/1998 | Murdock et al. |
| 5,768,607 | A | 6/1998 | Drews et al. |
| 5,777,614 | A | 7/1998 | Ando et al. |
| 5,787,198 | A | 7/1998 | Agazzi et al. |
| 5,806,032 | A | 9/1998 | Sproat |
| 5,835,667 | A | 11/1998 | Wactlar et al. |
| 5,862,259 | A | 1/1999 | Bokser et al. |
| 5,875,108 | A | 2/1999 | Hoffberg et al. |
| 5,960,447 | A | 9/1999 | Holt et al. |
| 5,963,940 | A | 10/1999 | Liddy et al. |
| 5,970,473 | A | 10/1999 | Gerszberg et al. |
| 6,006,184 | A | 12/1999 | Yamada et al. |
| 6,006,221 | A | 12/1999 | Liddy et al. |
| 6,024,571 | A | 2/2000 | Renegar |
| 6,026,388 | A | 2/2000 | Liddy et al. |
| 6,029,124 | A | 2/2000 | Gillick et al. |
| 6,029,195 | A | 2/2000 | Herz |
| 6,052,657 | A | 4/2000 | Yamron et al. |
| 6,064,963 | A | 5/2000 | Gainsboro |
| 6,067,514 | A | 5/2000 | Chen |
| 6,067,517 | A | 5/2000 | Bahl et al. |
| 6,073,096 | A | 6/2000 | Gao |
| 6,076,053 | A | 6/2000 | Juang et al. |
| 6,088,669 | A | 7/2000 | Mayes |
| 6,112,172 | A | 8/2000 | True et al. |
| 6,119,163 | A | 9/2000 | Monteiro et al. |
| 6,151,598 | A | 11/2000 | Shaw et al. |
| 6,161,087 | A | 12/2000 | Wightman et al. |
| 6,169,789 | B1 | 1/2001 | Rao et al. |
| 6,185,531 | B1 | 2/2001 | Schwartz |
| 6,219,640 | B1 | 4/2001 | Basu et al. |
| 6,246,983 | B1 | 6/2001 | Zou |
| 6,253,179 | B1 | 6/2001 | Beigi et al. |
| 6,266,667 | B1 | 7/2001 | Olsson |
| 6,308,222 | B1 | 10/2001 | Krueger et al. |
| 6,317,716 | B1 | 11/2001 | Braida et al. |
| 6,332,139 | B1 | 12/2001 | Kaneko et al. |
| 6,332,147 | B1 | 12/2001 | Moran et al. |
| 6,345,252 | B1 | 2/2002 | Beigi et al. |
| 6,347,295 | B1 | 2/2002 | Vitale |
| 6,360,234 | B2 | 3/2002 | Jain et al. |
| 6,360,237 | B1 | 3/2002 | Schulz et al. |
| 6,373,985 | B1 | 4/2002 | Hu et al. |
| 6,381,640 | B1 | 4/2002 | Powers et al. |
| 6,434,520 | B1 | 8/2002 | Kanevsky et al. |
| 6,437,818 | B1 | 8/2002 | Lauwers et al. |
| 6,463,444 | B1 | 10/2002 | Jain et al. |
| 6,480,826 | B2 | 11/2002 | Petrushin |
| 6,567,980 | B1 | 5/2003 | Jain et al. |
| 6,571,208 | B1 | 5/2003 | Kuhn et al. |
| 6,602,300 | B2 | 8/2003 | Ushioda et al. |
| 6,604,110 | B1 | 8/2003 | Savage et al. |
| 6,611,803 | B1 | 8/2003 | Furuyama et al. |
| 6,624,826 | B1 | 9/2003 | Balabanovic |
| 6,647,383 | B1 | 11/2003 | August et al. |
| 6,654,735 | B1 | 11/2003 | Eichstaedt et al. |
| 6,708,148 | B2 | 3/2004 | Gschwendtner et al. |
| 6,711,541 | B1 | 3/2004 | Kunh et al. |
| 6,714,911 | B2 | 3/2004 | Waryas et al. |
| 6,718,303 | B2 | 4/2004 | Tang et al. |
| 6,718,305 | B1 | 4/2004 | Hab-Umbach |
| 6,728,673 | B2 | 4/2004 | Furuyama et al. |
| 6,732,183 | B1 | 5/2004 | Graham |
| 6,748,350 | B2 | 6/2004 | Rumer et al. |
| 6,778,958 | B1 | 8/2004 | Nishimura et al. |
| 6,778,979 | B2 | 8/2004 | Grefenstette et al. |
| 6,792,409 | B2 | 9/2004 | Wutte |
| 6,847,961 | B2 | 1/2005 | Silverbrook et al. |
| 6,877,134 | B1 | 4/2005 | Fuller et al. |
| 6,922,691 | B2 | 7/2005 | Flank |
| 6,931,376 | B2 | 8/2005 | Lipe et al. |
| 6,961,954 | B1 | 11/2005 | Maybury et al. |
| 6,973,428 | B2 | 12/2005 | Boguraev et al. |
| 6,978,277 | B2 | 12/2005 | Reed et al. |
| 6,999,918 | B2 | 2/2006 | Ma et al. |
| 7,131,117 | B2 | 10/2006 | Mills et al. |
| 7,146,317 | B2 | 12/2006 | Bartosik et al. |
| 7,171,360 | B2 | 1/2007 | Huang et al. |
| 7,257,528 | B1 | 8/2007 | Ritchie et al. |
| 2001/0026377 | A1 | 10/2001 | Ikegami |
| 2001/0051984 | A1 | 12/2001 | Fukasawa |
| 2002/0001261 | A1 | 1/2002 | Matsui et al. |
| 2002/0010575 | A1 | 1/2002 | Haase |
| 2002/0010916 | A1 | 1/2002 | Thong et al. |
| 2002/0049589 | A1 | 4/2002 | Poirier |
| 2002/0059204 | A1 | 5/2002 | Harris |
| 2002/0133477 | A1 | 9/2002 | Abel |
| 2002/0184373 | A1 | 12/2002 | Maes |
| 2003/0051214 | A1 | 3/2003 | Graham et al. |
| 2003/0088414 | A1 | 5/2003 | Huang et al. |
| 2003/0093580 | A1 | 5/2003 | Thomas et al. |
| 2003/0167163 | A1 | 9/2003 | Glover et al. |
| 2003/0224760 | A1 | 12/2003 | Day |
| 2004/0024739 | A1 | 2/2004 | Copperman et al. |
| 2004/0073444 | A1 | 4/2004 | Peh et al. |
| 2005/0060162 | A1 | 3/2005 | Mohit et al. |
| 2006/0129541 | A1 | 6/2006 | Morgan et al. |

FOREIGN PATENT DOCUMENTS

| | | |
|---|---|---|
| EP | 0935378 | 8/1999 |
| EP | 0715298 | 6/2000 |
| EP | 1079313 | 2/2001 |
| EP | 1103952 | 5/2001 |
| EP | 1176493 | 1/2002 |
| EP | 1 422 692 A2 | 5/2004 |
| JP | 361285570 A | 12/1986 |
| WO | WO-99/17235 | 4/1999 |
| WO | WO-00/59223 | 10/2000 |
| WO | WO-02/29612 | 4/2002 |
| WO | WO-02/29614 | 4/2002 |

OTHER PUBLICATIONS

Office Action issued in U.S. Appl. No. 10/610,532 on Feb. 20, 2007.
Office Action issued in U.S. Appl. No. 10/610,559 on Oct. 12, 2007.
Office Action issued in U.S. Appl. No. 10/610,696 on Sep. 14, 2007.
Office Action issued in U.S. Appl. No. 10/610,699 on Jun. 20, 2007.
Office Action issued in U.S. Appl. No. 10/685,403 on Mar. 21, 2007.
Office Action issued in U.S. Appl. No. 10/685,410 on Sep. 13, 2007.
Office Action issued in U.S. Appl. No. 10/685,445 on Oct. 23, 2007.
Office Action issued in U.S. Appl. No. 10/685,478 on May 4, 2007.
Office Action issued in U.S. Appl. No. 10/685,478 on Oct. 23, 2007.
Office Action issued in U.S. Appl. No. 10/685,479 on Nov. 16, 2007.
Office Action issued in U.S. Appl. No. 10/685,566 on Sep. 27, 2007.
Office Action issued in U.S. Appl. No. 10/685,586 on Sep. 28, 2007.
Fancourt et al., "On The Use of Neural Networks In the Generalized Likelihood Ratio Test For Detecting Abrupt Changes In Signals," IEEE, IJCNN, pp. 243-248, 2000.
Siegler et al., "Automatic Segmentation, Classification and Clustering of Broadcast News Audio," Proceedings of the DARPA Broadcast News Transcription and Understanding Workshop, 1998.
Voutilainen, A., "A Syntax-Based Part-Of-Speech Analyzer," EACL-95, pp. 157-164, 1995.
Office Action issued in U.S. Appl. No. 10/610,560 on Feb. 7, 2008.
Cutting, et al "A Practical Part-of-Speech Tagger," Proceedings of the 3rd Conference on Applied Natural Language Processing, ACL 1992, pp. 133-140.

Beeferman et al, "Cyberpunc: A Lightweight Punctuation Annotation System for Speech," Proceedings of the 1999 IEEE Conference on Acoustics, Speech and Signal Processing, ICASSP'98 May 12-15, 1999, 2:689-692.

Shriberg et al, "Can Prosody Aid the Automatic Processing of Mult-Party Meetings? Evidence from Predicting Punctuation, Disfluencies, and Overlapping Speech," Proceedings of the ISCA Tutorial and Research Workshop on Prosody in Speech Recognition and Understanding, Oct. 2001, pp. 139-140.

Guavain et al, "Transcribing Broadcast News Shows," IEEE International Conference on Acoustics, Speech and Signal Processing, ICASSP'97, 2:21-24, Apr. 1997, p. 715-718.

Waibel et al, "Meeting Browser: Tracking and Summarizing Meetings," Proceedings of DARPA Broadcast News Workshop, 1998.

Ferret et al, "A Thematic Segmentation Procedure for Extracting Semantic Domains from Texts," ECAI '98, Brighton, UK, 1998.

Aversano, G., et al., "A New Text-Independent Method for Phoneme Segmentation," Proceedings of the 44th IEEE Midwest Symposium on Circuits and Systems, vol. 2, pp. 516-519, 2001.

Beigi et al., "A Distance Measure Between Collections of Distributions and its Applications to Speaker Recognition" IEEE International Conference on Acoustics, Speech and Signal Processing, ICASSP'89, May 12-15, 1998, vol. 2, pp. 753-756.

"Informedia: Integrated Speech, Image, and Language Understanding for the Creation and Exploration of Digital Video Libraries", Carnegie Mellon University Informedia Digital Video Library, NSF Cooperative Agreement IRI 9411299, Quarterly Report, Aug. 1996, Howard D. Wactlar, Project Director, http://www.informedia.cs.cmu.edu/dli1/reports/Quarterly7_Aug1996.html as accessed on Jun. 22, 2006.

Ahangar et al., "A Survey of Technologies for Parsing and Indexing Digital Video" Multimedia Communication Laboratory, Department of Electrical, Computer and Systems Engineering, Boston, MA, 1995.

Change et al., "Columbia's VoD and Multimedia Research Testbed With Heterogeneous Network Support" Journal on Multimedia Tools and Applications, Special Issue on Video on Demand, Kluwer Academic Publishers, 1997, p. 1-10.

Christel et al., "Techniques for the Creation and Exploration of Digital Video Libraries", Multimedia Tools and Applications, 1996.

Disz et al., "The Argonne Voyager Multimedia Server, Mathematics and Computer Science Division" Argonne National Laboratory, Argonne, IL, 1997.

Gauch et al., "Real Time Video Analysis for Automatic Archive Creation" Electrical Engineering and Computer Science, The University of Kansas, pp. 1-18, 1998.

Hampapur et al., "Virage Video Engine", Virage Inc, 1997.

Hauptman et al., "Text, Speech, and Vision for Video Segmentation: The Informedia Project" School of Computer Science, Carnegie Mellon University, 1995.

Li et al., "VISION: A Digital Video Library," Dept. of Electrical Engineering and Computer Science, The University of Kansas, pp. 19-27, 1996.

Nakamura et al., "Semantic Analysis for Video Contents Extraction-Spotting by Association in News Video", Institute of Information Sciences and Electronics, University of Tsukuba, Japan, 1997.

The Informedia Digital Video Library: Integrated Speech, Image, and Language Understanding for the Creation and Exploration of Digital Video Libraries, Proposal responding to Announcement NSF 93-141 Research on Digital Libraries Copyright (c) 1994. http://www.informedia.cs.cmu.edu/dli1/reports/dli1Proposal.html accessed on Jul. 22, 2006. pp. 1-48.

Van Thong et al., "SPEECHBOT: An Experimental Speech-Based Search Engine for Multimedia Content in the Web", Compaq, Cambridge Research Laboratory, Technical Report Series CRL, Jul. 2001.

Wactlar et al, "Informedia : News-on-Demand Experiments in Speech Recognition", School of Computer Science, Carnegie Mellon University, Pittsburg, PA 15213-3890, 1996.

Office Action issued in U.S. Appl. No. 10/610,559 on Jul. 1, 2008.

Amit Srivastava et al.: "Sentence Boundary Detection in Arabic Speech," 8th European Conference on Speech Communication and Technology, Sep. 1-4, 2003 in Geneva, Switzerland; 4 pages.

Sreenivasa Sista et al.: "Unsupervised Topic Discovery Applied To Segmentation Of News Transcriptions," 8th European Conference on Speech Communication and Technology, Sep. 1-4, 2003 in Geneva. Switzerland; 4 pages.

Daben Liu et al.: "Online Speaker Clustering," ICASSP 2003, vol. I, pp. 572-575, 2003.

J. Billa et al.: "Audio Indexing Of Arabic Broadcast News," ICASSP 2002; Orlando, FL; May 13-17, 2002; 4 pages.

Scott Shepard et al.: "Oasis Translator's Aide," Human Language Technology Conference; San Diego, California; 2002; 2 pages.

Scott Shepard et al.: "Newsroom OnTAP—Real-time alerting from streaming audio," Dec.-Jan. 2001 HLT Paper; 2 pages.

Heidi Christensen et al.: "Punctuation Annotation using Statistical Prosody Models," The Proceedings of Eurospeech, Denmark, 2001; 6 pages.

Ji-Hwan Kim et al.: "The Use Of Prosody In A Combined System For Punctuation Generation And Speech Recognition," The Proceedings of Eurospeech, Denmark, 2001; 4 pages.

Jing Huang et al.: "Maximum Entropy Model For Punctuation Annotation From Speech," The Proceedings of Eurospeech, Denmark, 2001; pp. 917-920.

Yoshihiko Gotoh et al.: "Sentence Boundary Detection in Broadcast Speech Transcripts," Proceedings of the International Speech Communication Association Workshop: Automatic Speech Recognition: Challenges for the New Millennium, Paris, Sep. 2000; 8 pages.

John Makhoul et al.: "Speech and Language Technologies for Audio Indexing and Retrieval," Proceedings of the IEEE, vol. 88, No. 8, Aug. 2000; pp. 1338-1353.

Francis Kubala et al.: "Integrated Technologies For Indexing Spoken Language," Communications of the ACM, vol. 43, No. 2, Feb. 2000; pp. 48-56.

Sean Colbath et al.: "Spoken Documents: Creating Searchable Archives from Continuous Audio," Proceedings of the 33rd Hawaii International Conference on System Sciences-2000; pp. 1-9.

Francis Kubala et al.: "Situation Awareness Contexts for Smart Environments," Inter-Agency Workshop on Research Issues for Smart Environments; Atlanta, GA; 2000; 3 pages.

Daben Liu et al.: "Fast Speaker Change Detection For Broadcast News Transcription And Indexing," The Proceedings of Eurospeech 1999; Budapest, Hungary; 4 pages.

Daniel M. Bikel et al.: "An Algorithm that Learns What's in a Name," Machine Learning, 1999; pp. 1-20.

Richard Schwartz et al.: "Accurate Near-Real-Time Recognition of Broadcast News using Multiple-Pass Search Techniques," 1999 Workshop on Automatic Speech Recognition and Understanding, Dec. 12-15, 1999; Keystone, Colorado; 6 pages.

Francis Kubala et al.: "Smart Information Spaces: Managing Personal and Collaborative Histories," Proceedings of the 1998 DARPA/NIST Smart Spaces Workshop, Jul. 30-31, 1998; 6 pages.

Daben Liu et al.: "Improvements in Spontaneous Speech Recognition," Proceedings of the DARPA Broadcast News Transcription and Understanding Workshop; Feb. 8-11, 1998 in Lansdowne, Virginia; 5 pages.

Francis Kubala et al.: "The 1997 BBN Byblos System Applied To Broadcast News Transcription," Cambridge, Massachusetts; 1997; 6 pages.

Hubert Jin et al.: "Automatic Speaker Clustering," ICFEM, Chantilly, Virginia; Feb. 1997; 4 pages.

Sean Colbath et al.: "OnTAP: Mixed-media Multi-lingual Language Processing," Human Language Technology Conference, San Diego, CA; 2002; 2 pages.

Andreas Stolcke et al.: "Automatic Linguistic Segmentation Of Conversational Speech," *Proceedings of the International Conference on Spoken Language Processing*, vol. 2, Philadelphia 1996; pp. 1005-1008.

Scott S. Chen et al.: "Speaker, Environment and Channel Change Detection and Clustering via the Bayesian Information Criterion," in DARPA Speech Recognition Workshop, 1998, 6 pages.

Marti A. Hearst: "Multi-Paragraph Segmentation of Expository Text," in Proceedings of the $2^{nd}$ Annual Meeting of the Association for Computational Linguistics, New Mexico State University, Las Cruces, NM, 1994, pp. 1-8.

\* cited by examiner

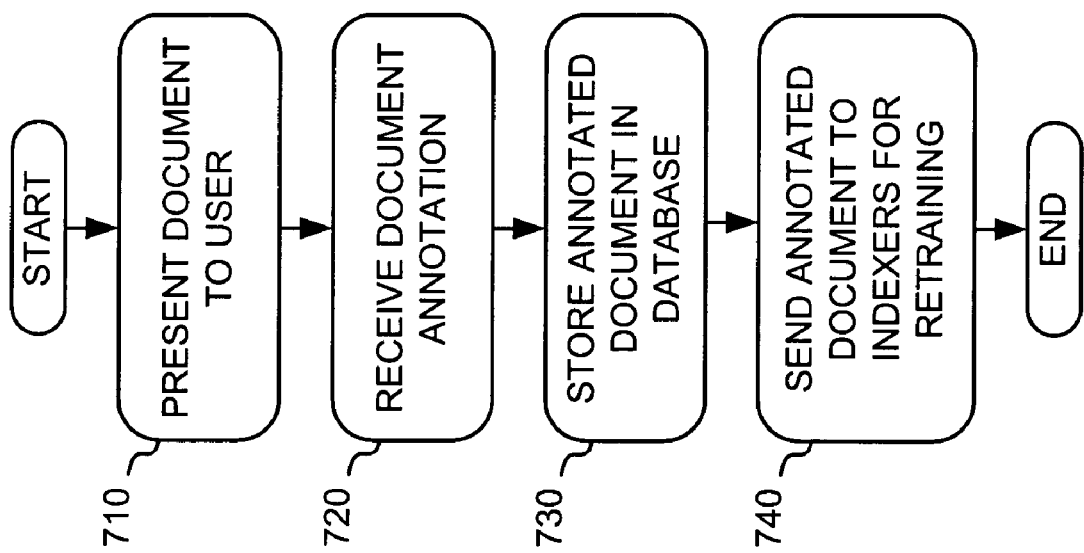

FIG. 8

| | |
|---|---|
| FILE EDIT VIEW GO WINDOW HELP | |
| World News Tonight 01/03/98 | ANNOTATE — 810 |
| FEMALE 1 | it's a strategy to pressure on council making deals and it's known each day in Southern California latest danger from hell. | FOREIGN RELATIONS WITH THE UNITED STATES |
| MALE 2 | From ABC news World headquarters in New York january thirty first nineteen ninety ... this is world news tonight saturday here's Elizabeth Vargas. | INSPECTIONS<br>UNITED NATIONS<br>IRAQ<br>POLITICS AND GOVERNMENT |
| ELIZABETH VARGAS | Good evening and defense secretary William Cohen said today that a military strike against a rock would be quote substantial in size and impact but Cohen stressed that the strike would not be able to remove Saddam Hussein from power or eliminate his deadly arsenal the defense secretary also had strong words today for the United Nations Security Council ABC's John NOTE reports. | — 820 |
| MALE 4 | With more american firepower being considered for the Persian Gulf defense secretary Cohen today issued by are the administration's toughest criticism of the UN security council without mentioning Russia or China buying named Cohen took dead aim at their reluctance to get tough with Iraq. | |

830 points to NOTE
800 points to window

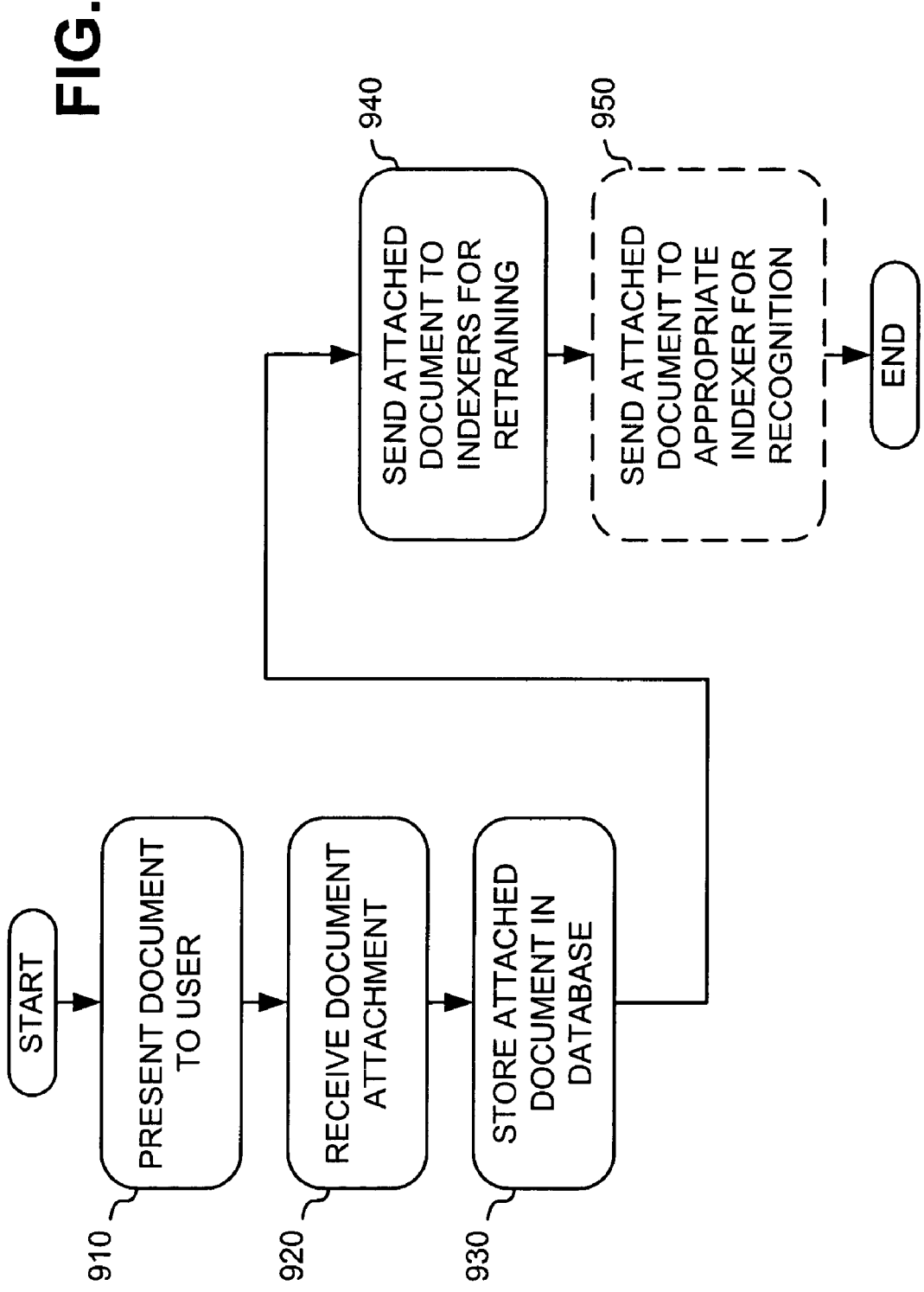

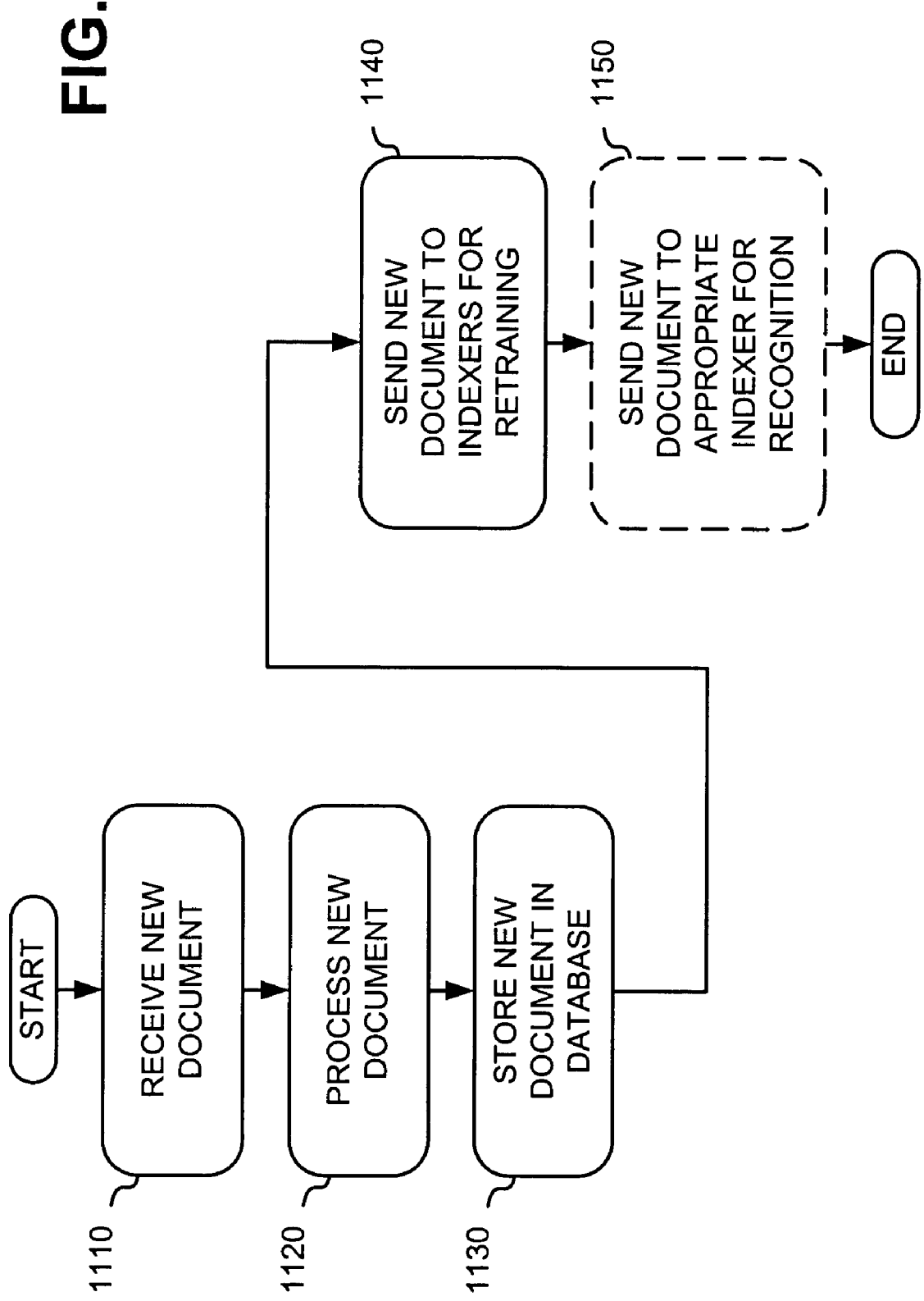

MULTIMEDIA RECOGNITION SYSTEM COMPRISING A PLURALITY OF INDEXERS CONFIGURED TO RECEIVE AND ANALYZE MULTIMEDIA DATA BASED ON TRAINING DATA AND USER AUGMENTATION RELATING TO ONE OR MORE OF A PLURALITY OF GENERATED DOCUMENTS

RELATED APPLICATION

This application claims priority under 35 U.S.C. §119 based on U.S. Provisional Application Nos. 60/394,064 and 60/394,082, filed Jul. 3, 2002, and Provisional Application No. 60/419,214, filed Oct. 17, 2002, the disclosures of which are incorporated herein by reference.

BACKGROUND OF THE INVENTION

1. Field of the Invention

The present invention relates generally to multimedia environments and, more particularly, to systems and methods for improving recognition results of a multimedia recognition system via user-augmentation of a linguistic database.

2. Description of Related Art

Current multimedia recognition systems obtain multimedia documents from a fixed set of sources. These documents include audio documents (e.g., radio broadcasts), video documents (e.g., television broadcasts), and text documents (e.g., word processing documents). A typical recognition system processes the documents and stores them in a database. In the case of audio or video documents, the recognition system might transcribe the documents to identify information, such as the words spoken, the identity of one or more speakers, one or more topics relating to the documents, and, in the case of video, the identity of one or more entities (persons, places, objects, etc.) appearing in the video.

When a user later desires to access the documents, the user usually queries or searches the database. For example, the user might use a standard database interface to submit a query relating to documents of interest. The database would then process the query to retrieve documents that are relevant to the query and present the documents (or a list of the documents) to the user. The documents provided to the user are usually only as good, however, as the recognition system that created them.

It has been found that the recognition results of a multimedia recognition system typically degrade over time, as new words are introduced into the system. Oftentimes, the recognition system cannot accurately recognize the new words.

Accordingly, it is desirable to improve recognition results of a multimedia recognition system.

SUMMARY OF THE INVENTION

Systems and methods consistent with the present invention permit users to augment a database of a multimedia recognition system by annotating, attaching, inserting, correcting, and/or enhancing documents. The systems and methods use this user-augmentation to improve the recognition results of the recognition system.

In one aspect consistent with the principles of the invention, a system improves recognition results. The system receives multimedia data and recognizes the multimedia data based on training data to generate documents. The system receives user augmentation relating to one of the documents. The system supplements the training data with the user augmentation and retrains based on the supplemented training data.

In another aspect consistent with the principles of the invention, a multimedia recognition system receives different types of multimedia data and recognizes the multimedia data based on training data to generate recognition results. The system obtains new documents from one or more users and adds the new documents to the training data to obtain new training data. The system retrains based on the new training data.

BRIEF DESCRIPTION OF THE DRAWINGS

The accompanying drawings, which are incorporated in and constitute a part of this specification, illustrate the invention and, together with the description, explain the invention. In the drawings.

FIG. 7 is a flowchart of exemplary processing for annotating documents with bookmarks, highlights, and notes according to an implementation consistent with the principles of the invention;

FIG. 8 is a diagram of an exemplary graphical user interface that displays an annotated document according to an implementation consistent with the principles of the invention;

FIG. 9 is a flowchart of exemplary processing for attaching documents according to an implementation consistent with the principles of the invention;

FIG. 11 is a flowchart of exemplary processing for adding new documents according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention permit users to augment a database of a multimedia recognition system by, for example, annotating, attaching, inserting, correcting, and/or enhancing documents. The systems and methods may use this user-augmentation to improve the recognition results of the recognition system. For example, the user-augmentation may be used to improve the documents stored in the database. The user-augmentation may also be used for system retraining.

EXEMPLARY SYSTEM

Figure 1:
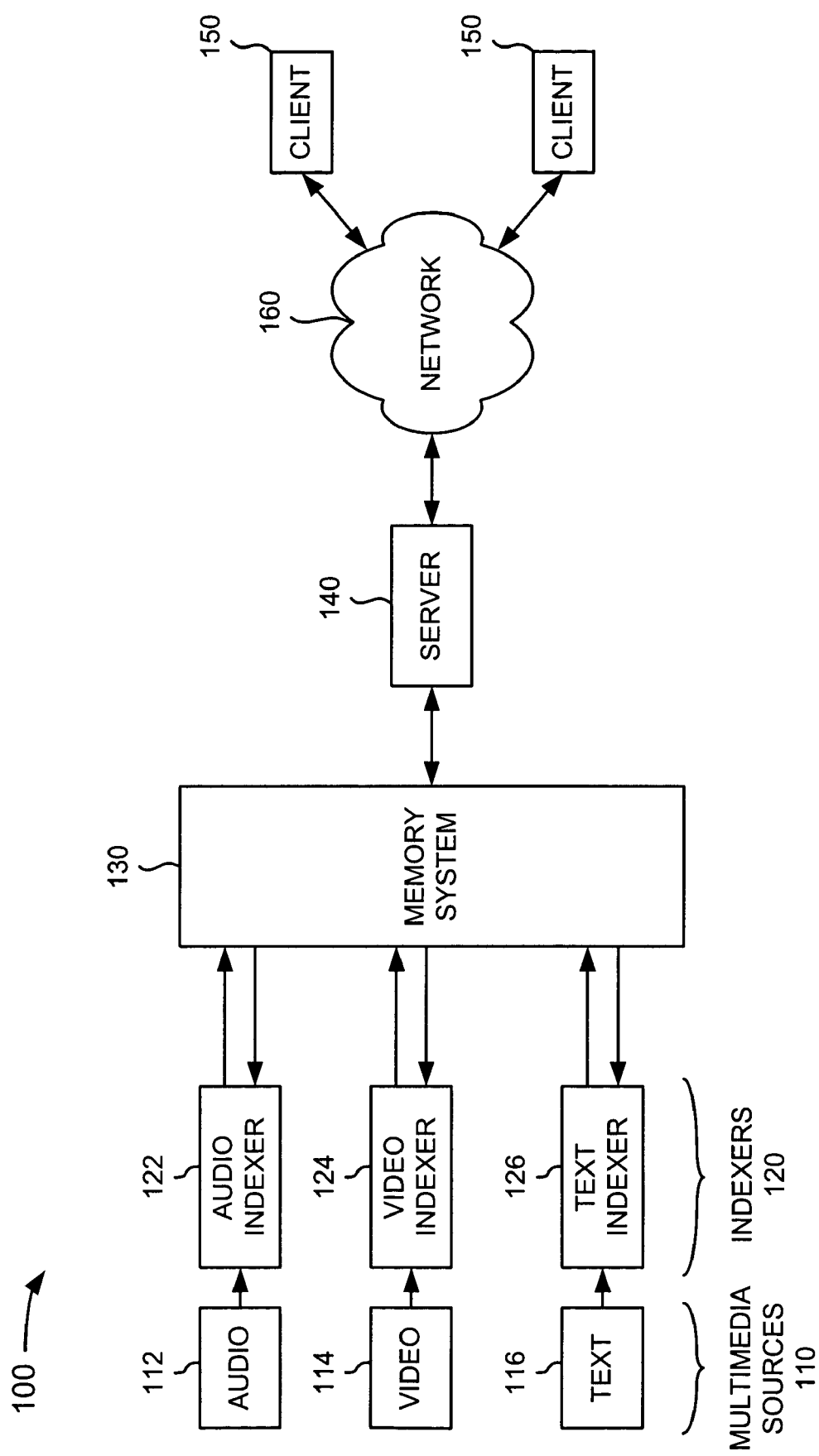
FIG. 1 is a diagram of a system in which systems and methods consistent with the present invention may be implemented.

FIG. 1 is a diagram of an exemplary system 100 in which systems and methods consistent with the present invention may be implemented. System 100 may include multimedia sources 110, indexers 120, memory system 130, and server 140 connected to clients 150 via network 160. Network 160 may include any type of network, such as a local area network (LAN), a wide area network (WAN) (e.g., the Internet), a public telephone network (e.g., the Public Switched Telephone Network (PSTN)), a virtual private network (VPN), or a combination of networks. The various connections shown in FIG. 1 may be made via wired, wireless, and/or optical connections.

Multimedia sources 110 may include one or more audio sources 112, one or more video sources 114, and one or more text sources 116. Audio source 112 may include mechanisms for capturing any source of audio data, such as radio, telephone, and conversations, in any language, and providing the audio data, possibly as an audio stream or file, to indexers 120. Video source 114 may include mechanisms for capturing any source of video data, with possibly integrated audio data in any language, such as television, satellite, and a camcorder, and providing the video data, possibly as a video stream or file, to indexers 120. Text source 116 may include mechanisms for capturing any source of text, such as e-mail, web pages, newspapers, and word processing documents, in any language, and providing the text, possibly as a text stream or file, to indexers 120.

Indexers 120 may include one or more audio indexers 122, one or more video indexers 124, and one or more text indexers 126. Each of indexers 122, 124, and 126 may include mechanisms that receive data from multimedia sources 110, process the data, perform feature extraction, and output analyzed, marked-up, and enhanced language metadata. In one implementation consistent with the principles of the invention, indexers 122-126 include mechanisms, such as the ones described in John Makhoul et al., "Speech and Language Technologies for Audio Indexing and Retrieval," Proceedings of the IEEE, Vol. 88, No. 8, August 2000, pp. 1338-1353, which is incorporated herein by reference.

Audio indexer 122 may receive input audio data from audio sources 112 and generate metadata therefrom. For example, indexer 122 may segment the input data by speaker, cluster audio segments from the same speaker, identify speakers by name or gender, and transcribe the spoken words. Indexer 122 may also segment the input data based on topic and locate the names of people, places, and organizations. Indexer 122 may further analyze the input data to identify when each word was spoken (possibly based on a time value). Indexer 122 may include any or all of this information in the metadata relating to the input audio data.

Video indexer 124 may receive input video data from video sources 122 and generate metadata therefrom. For example, indexer 124 may segment the input data by speaker, cluster video segments from the same speaker, identify speakers by name or gender, identify participants using face recognition, and transcribe the spoken words. Indexer 124 may also segment the input data based on topic and locate the names of people, places, and organizations. Indexer 124 may further analyze the input data to identify when each word was spoken (possibly based on a time value). Indexer 124 may include any or all of this information in the metadata relating to the input video data.

Text indexer 126 may receive input text data from text sources 116 and generate metadata therefrom. For example, indexer 126 may segment the input data based on topic and locate the names of people, places, and organizations. Indexer 126 may further analyze the input data to identify when each word occurs (possibly based on a character offset within the text). Indexer 126 may also identify the author and/or publisher of the text. Indexer 126 may include any or all of this information in the metadata relating to the input text data.

Figure 2:
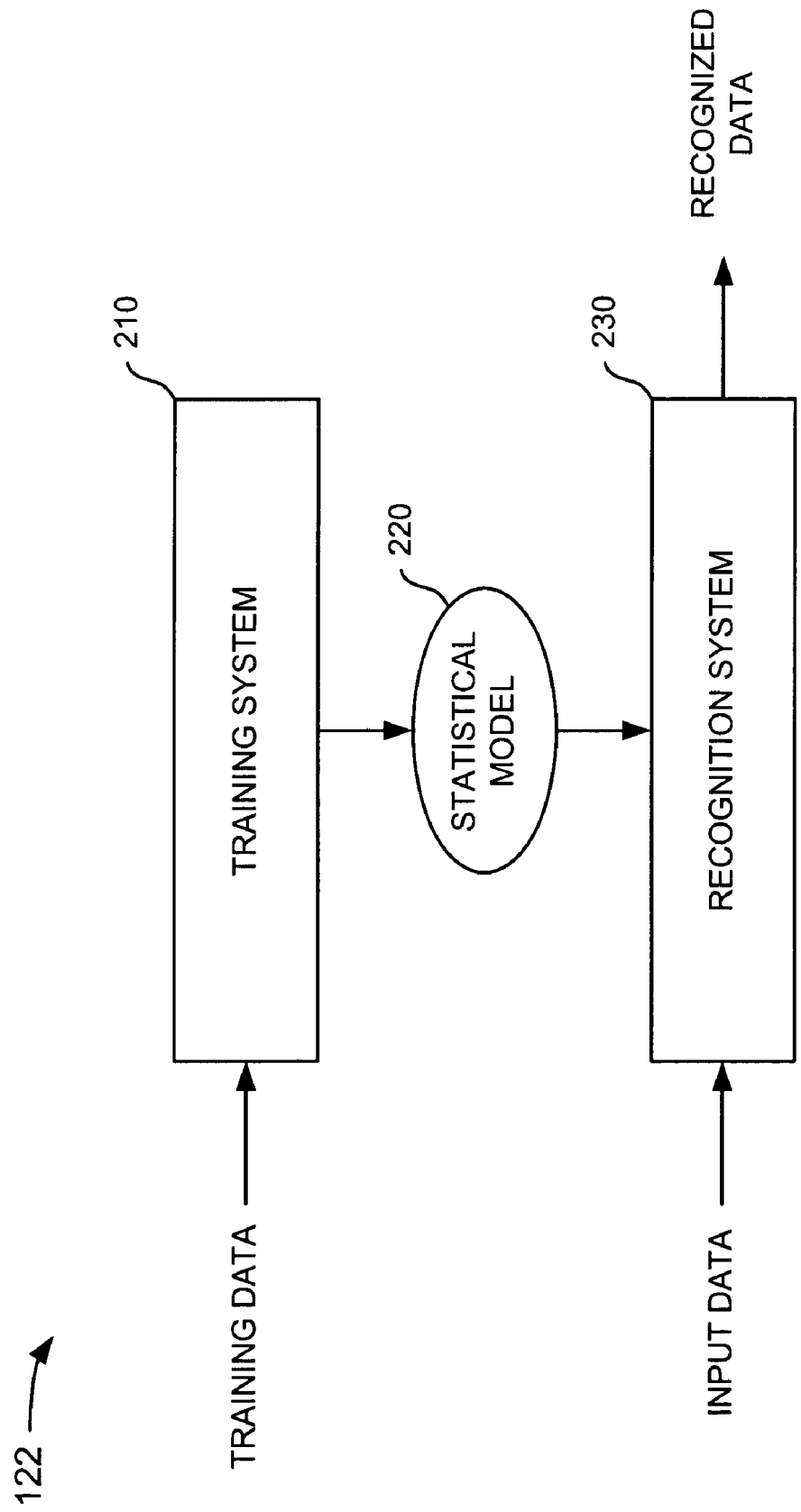
FIG. 2 is an exemplary diagram of the audio indexer of FIG. 1 according to an implementation consistent with the principles of the invention.

FIG. 2 is an exemplary diagram of audio indexer 122. Video indexer 124 and text indexer 126 may be similarly configured. Indexers 124 and 126 may include, however, additional and/or alternate components particular to the media type involved.

As shown in FIG. 2, indexer 122 may include training system 210, statistical model 220, and recognition system 230. Training system 210 may include logic that estimates parameters of statistical model 220 from a corpus of training data. The training data may initially include human-produced data. For example, the training data might include one hundred hours of audio data that has been meticulously and accurately transcribed by a human. Training system 210 may use the training data to generate parameters for statistical model 220 that recognition system 230 may later use to recognize future data that it receives (i.e., new audio that it has not heard before).

Statistical model 220 may include acoustic models and language models. The acoustic models may describe the time-varying evolution of feature vectors for each sound or phoneme. The acoustic models may employ continuous hidden Markov models (HMMs) to model each of the phonemes in the various phonetic contexts.

The language models may include n-gram language models, where the probability of each word is a function of the previous word (for a bi-gram language model) and the previous two words (for a tri-gram language model). Typically, the higher the order of the language model, the higher the recognition accuracy at the cost of slower recognition speeds.

Figure 3:
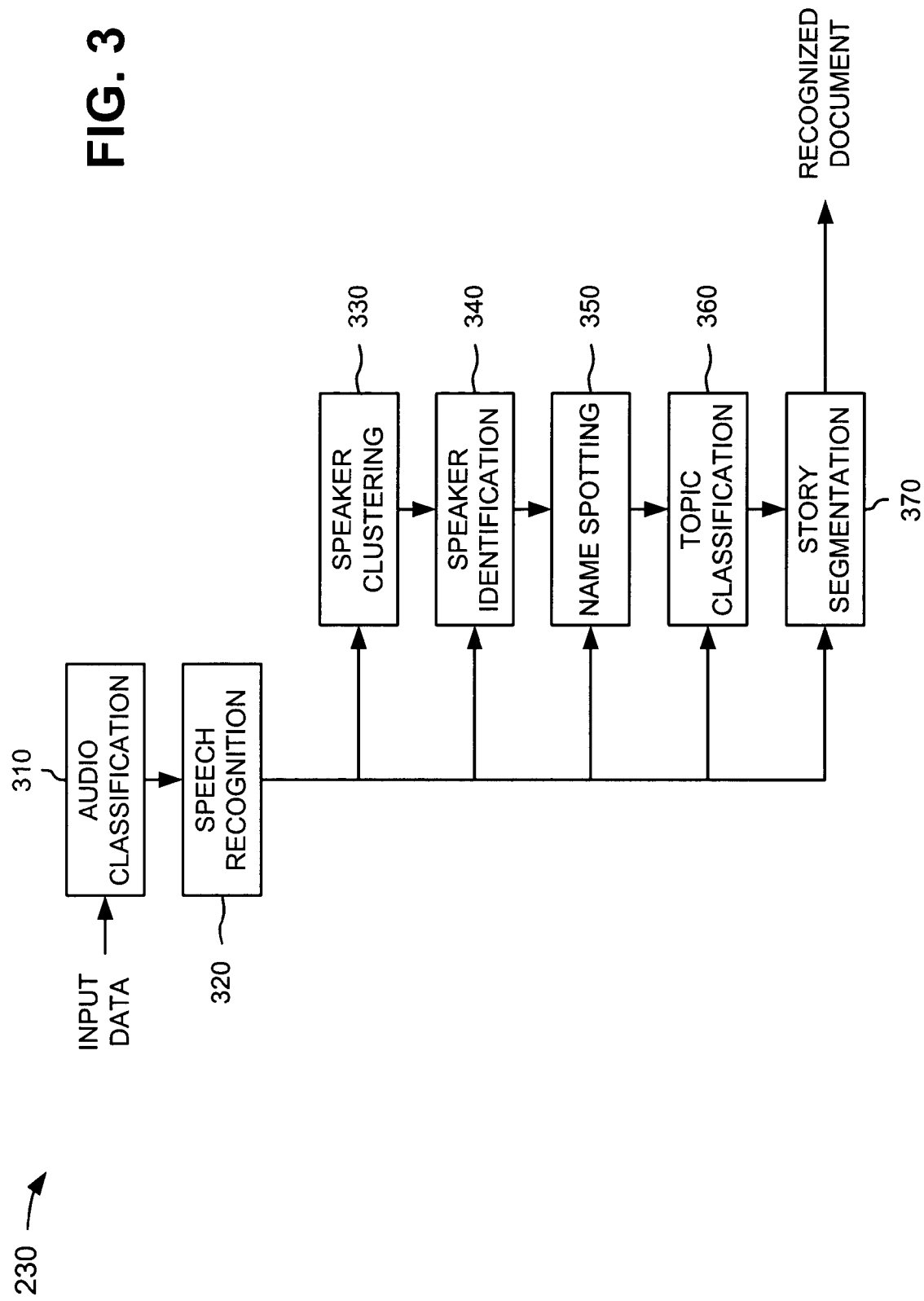
FIG. 3 is an exemplary diagram of the recognition system of FIG. 2 according to an implementation consistent with the present invention.

Recognition system 230 may use statistical model 220 to process input audio data. FIG. 3 is an exemplary diagram of recognition system 230 according to an implementation consistent with the principles of the invention. Recognition system 230 may include audio classification logic 310, speech recognition logic 320, speaker clustering logic 330, speaker identification logic 340, name spotting logic 350, topic classification logic 360, and story segmentation logic 370. Audio classification logic 310 may distinguish speech from silence, noise, and other audio signals in input audio data. For example, audio classification logic 310 may analyze each thirty second window of the input data to determine whether it contains speech. Audio classification logic 310 may also identify boundaries between speakers in the input stream. Audio classification logic 310 may group speech segments from the same speaker and send the segments to speech recognition logic 320.

Speech recognition logic 320 may perform continuous speech recognition to recognize the words spoken in the segments that it receives from audio classification logic 310. Speech recognition logic 320 may generate a transcription of the speech using statistical model 220. Speaker clustering logic 330 may identify all of the segments from the same speaker in a single document (i.e., a body of media that is contiguous in time (from beginning to end or from time A to time B)) and group them into speaker clusters. Speaker clustering logic 330 may then assign each of the speaker clusters a unique label. Speaker identification logic 340 may identify the speaker in each speaker cluster by name or gender.

Name spotting logic 350 may locate the names of people, places, and organizations in the transcription. Name spotting logic 350 may extract the names and store them in a database. Topic classification logic 360 may assign topics to the transcription. Each of the words in the transcription may contribute differently to each of the topics assigned to the transcription. Topic classification logic 360 may generate a rank-ordered list of all possible topics and corresponding scores for the transcription.

Story segmentation logic 370 may change the continuous stream of words in the transcription into document-like units with coherent sets of topic labels and other document features generated or identified by the components of recognition system 230. This information may constitute metadata corresponding to the input audio data. Story segmentation logic 370 may output the metadata in the form of documents to memory system 130, where a document corresponds to a body of media that is contiguous in time (from beginning to end or from time A to time B).

Figure 4:
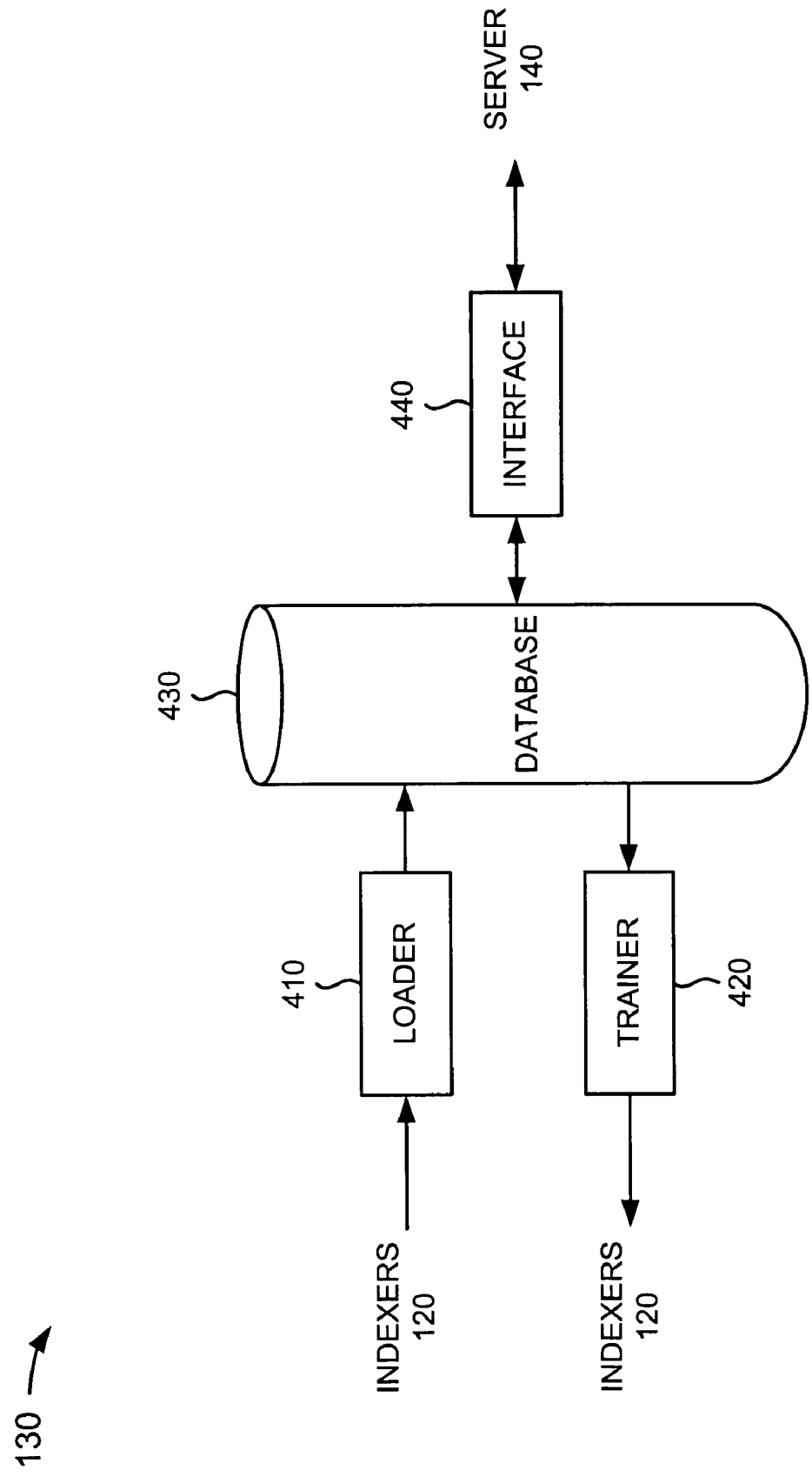
FIG. 4 is an exemplary diagram of the memory system of FIG. 1 according to an implementation consistent with the principles of the invention.

Returning to FIG. 1, memory system 130 may store documents from indexers 120 and documents from clients 150, as will be described in more detail below. FIG. 4 is an exemplary diagram of memory system 130 according to an implementation consistent with the principles of the invention. Memory system 130 may include loader 410, trainer 420, one or more databases 430, and interface 440. Loader 410 may include logic that receives documents from indexers 120 and stores them in database 430. Trainer 420 may include logic that sends documents in the form of training data to indexers 120.

Database 430 may include a conventional database, such as a relational database, that stores documents from indexers 120. Database 430 may also store documents received from clients 150 via server 140. Interface 440 may include logic that interacts with server 140 to store documents in database 130, query or search database 130, and retrieve documents from database 130.

Returning to FIG. 1, server 140 may include a computer or another device that is capable of interacting with memory system 130 and clients 150 via network 170. Server 140 may receive queries from clients 150 and use the queries to retrieve relevant documents from memory system 130. Server 140 may also receive documents or link to documents from clients 150 and store the documents in memory system 130. Clients 150 may include personal computers, laptops, personal digital assistants, or other types of devices that are capable of interacting with server 140 to retrieve documents from memory system 130 and provide documents, and possibly other information, to memory system 130. Clients 150 may present information to users via a graphical user interface, such as a web browser window.

EXEMPLARY PROCESSING

Systems and methods consistent with the present invention permit users to augment memory system 130 to improve recognition results of system 100. For example, the user-augmentation may be used to improve the value of documents stored in memory system 130 and may also be used to retrain indexers 120. The user-augmentation may include: (1) correction and/or enhancement of the documents; (2) annotation of the documents with bookmarks, highlights, and notes; (3) attachment of rich documents to documents from memory system 130; and (4) insertion of rich documents into system 100. Each of these will be described in detail below.

Document Correction and/or Enhancement

Figure 5:
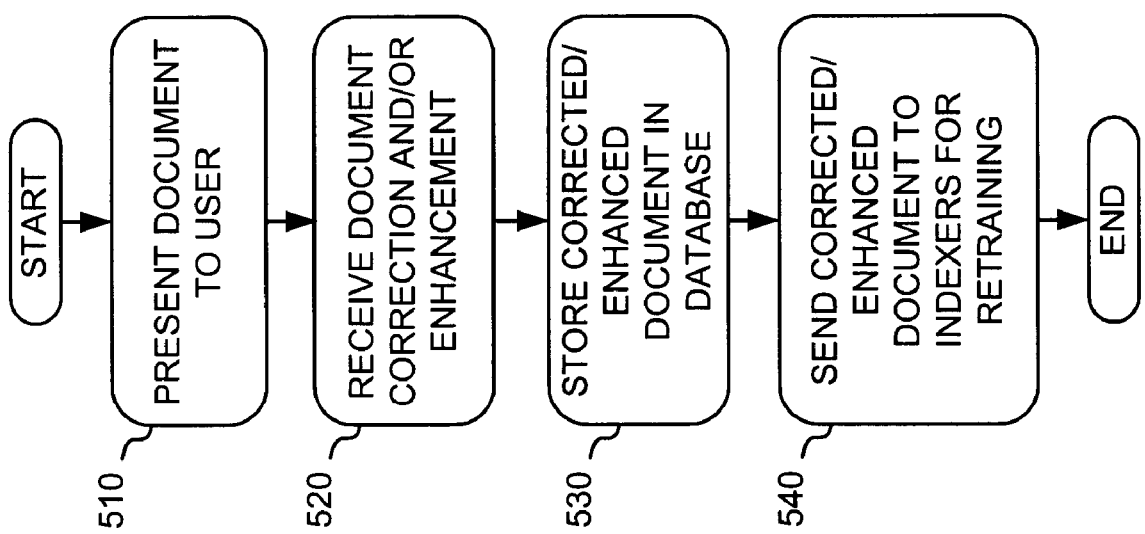
FIG. 5 is a flowchart of exemplary processing for correcting and/or enhancing documents according to an implementation consistent with the principles of the invention.

FIG. 5 is a flowchart of exemplary processing for correcting and/or enhancing documents according to an implementation consistent with the principles of the invention. Processing may begin with a user desiring to retrieve one or more documents from memory system 130. The user may use a conventional web browser of client 150 to access server 140 in a conventional manner. To obtain documents of interest, the user may generate a search query and send the query to server 140 via client 150. Server 140 may use the query to search memory system 130 and retrieve relevant documents.

Server 140 may present the relevant documents to the user (act 510). For example, the user may be presented with a list of relevant documents. The documents may include any combination of audio documents, video documents, and text documents. The user may select one or more documents on the list to view. In the case of an audio or video document, the user may be presented with a transcription of the audio data or video data corresponding to the document.

Figure 6:
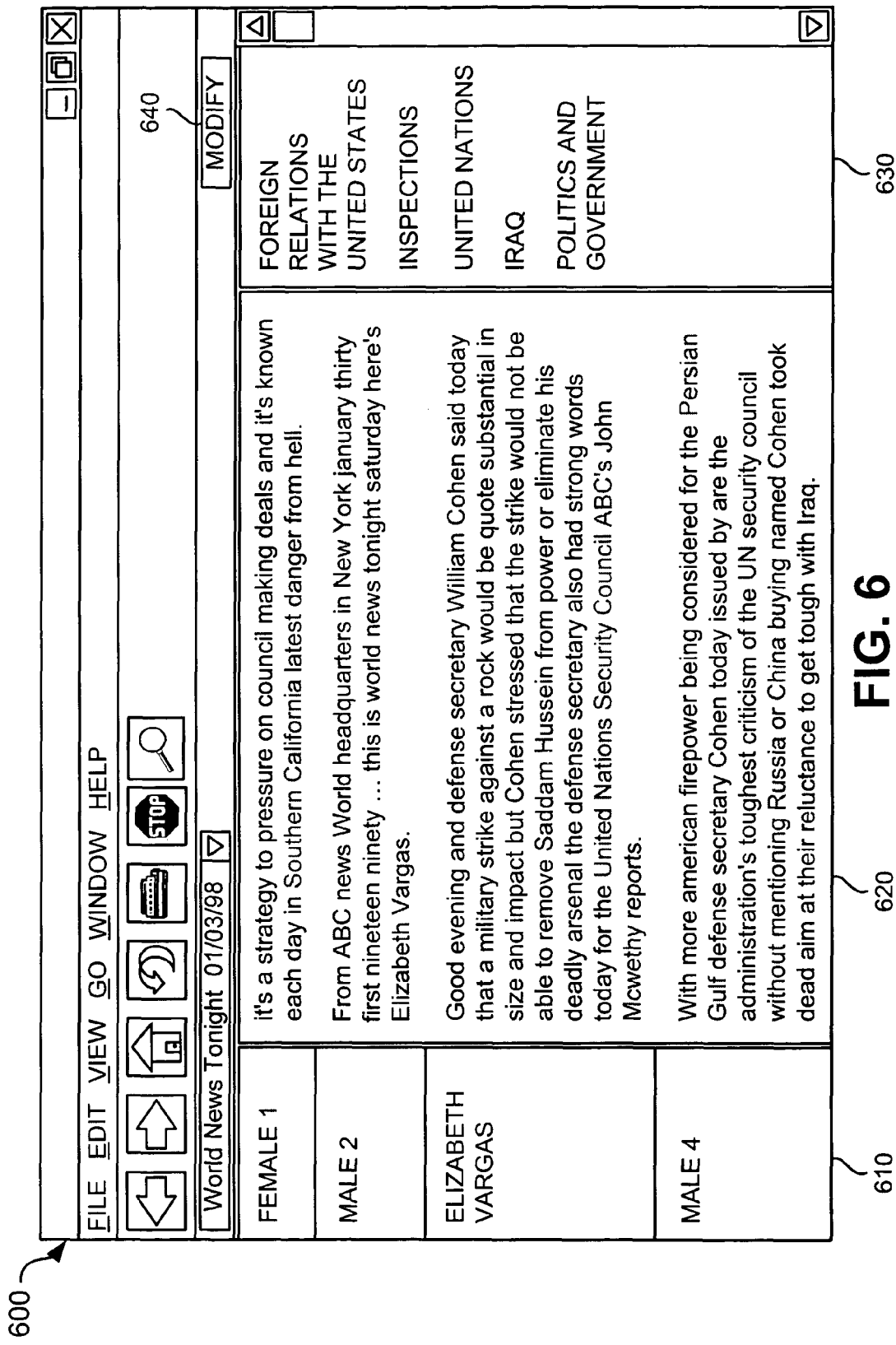
FIG. 6 is a diagram of an exemplary graphical user interface that facilitates correction and/or enhancement of a document according to an implementation consistent with the principles of the invention.

FIG. 6 is a diagram of an exemplary graphical user interface (GUI) 600 that facilitates correction and/or enhancement of a document according to an implementation consistent with the principles of the invention. In one implementation, GUI 600 is part of an interface of a standard Internet browser, such as Internet Explorer or Netscape Navigator, or any browser that follows World Wide Web Consortium (W3C) specifications for HTML.

GUI 600 may include a speaker section 610, a transcription section 620, and a topics section 630. Speaker section 610 may identify boundaries between speakers, the gender of a speaker, and the name of a speaker (when known). In this way, speaker segments are clustered together over the entire document to group together segments from the same speaker under the same label. In the example of FIG. 6, one speaker, Elizabeth Vargas, has been identified by name.

Transcription section 620 may include a transcription of the document. In the example of FIG. 6, the document corresponds to video data from a television broadcast of ABC's World News Tonight. Transcription section 620 may identify the names of people, places, and organizations by visually distinguishing them in some manner. For example, people, places, and organizations may be identified using different colors. Topic section 630 may include topics relating to the transcription in transcription section 620. Each of the topics may describe the main themes of the document and may constitute a very high-level summary of the content of the transcription, even though the exact words in the topic may not be included in the transcription.

GUI 600 may also include a modify button 640. The user may select modify button 640 when the user desires to correct and/or enhance the document. Sometimes, the document is incomplete or incorrect in some manner. For example, the document may identify unknown speakers by gender and may visually distinguish the names of people, places, and organizations. If the user desires, the user may provide the name of an unknown speaker or identify that one of the words in the transcription is the name of a person, place, or organization by selecting modify button 640 and providing the correct information. Alternatively, the document may contain an incorrect topic or a misspelling. If the user desires, the user may correct these items by selecting modify button 640 and providing the correct information.

GUI 600 may receive the information provided by the user and modify the document onscreen. This way, the user may determine whether the information was correctly provided. GUI 600 may also send the modified (i.e., corrected/enhanced) document to server 140.

Returning to FIG. 5, server 140 may receive the modified document and send it to memory system 130 (act 520). Memory system 130 may store the modified document in database 430 (FIG. 4) (act 530). Thereafter, when any user retrieves this document from database 430, the user gets the document with the correction(s)/enhancement(s). This may aid the user in browsing the document and determining whether the document is one in which the user is interested.

Memory system 130 may also send the modified document to one or more of indexers 120 for retraining (act 540). Memory system 130 may send the modified document in the form of training data. For example, memory system 130 may put the modified document in a special form for use by indexers 120 to retrain. Alternatively, memory system 130 may send the modified document to indexers 120, along with an instruction to retrain.

Training system 210 (FIG. 2) of indexers 120 may use the modified document to retrain. For example, training system 210 may supplement its corpus of training data with the modified document and generate new parameters for statistical model 220 based on the supplemented corpus of training data.

Suppose, for example, that the user provided the name of one of the speakers who was identified simply by gender in the document. Speaker identification logic 340 (FIG. 3) may use the name and the corresponding original audio data to recognize this speaker in the future. It may take more than a predetermined amount of audio from a speaker (e.g., more than five minutes of speech) before speaker identification logic 340 can begin to automatically recognize the speech from the speaker. By retraining based on corrected and/or enhanced documents, indexers 120 improve their recognition results.

Document Annotation

FIG. 7 is a flowchart of exemplary processing for annotating documents with bookmarks, highlights, and notes according to an implementation consistent with the principles of the invention. Processing may begin with a user desiring to retrieve one or more documents from memory system 130. The user may use a conventional web browser of client 150 to access server 140 in a conventional manner. To obtain documents of interest, the user may generate a search query and send the query to server 140 via client 150. Server 140 may use the query to search memory system 130 and retrieve relevant documents.

Server 140 may present the relevant documents to the user (act 710). For example, the user may be presented with a list of relevant documents. The documents may include any combination of audio documents, video documents, and text documents. The user may select one or more documents on the list to view the document(s). In the case of an audio or video document, the user may be presented with a transcription of the audio data or video data corresponding to the document.

If the user desires, the user may annotate a document. For example, the user may bookmark the document, highlight the document, and/or add a note to the document. FIG. 8 is a diagram of an exemplary graphical user interface (GUI) 800 that displays an annotated document according to an implementation consistent with the principles of the invention. Similar to GUI 600, GUI 800 includes a speaker section, a transcription section, and a topics section.

GUI 800 may also include annotate button 810, a highlighted block of text 820, and a note 830. If the user desires to annotate the document, the user may select annotate button 810. The user may then be presented with a list of annotation options, such as adding a bookmark, highlight, or note. If the user desires to bookmark the document, the user may select the bookmark option. In this case, GUI 800 may add a flag to the document so that the user may later be able to easily retrieve the document from memory system 130. In some instances, the user may be able to share bookmarks with other users.

If the user desires to highlight a portion of the document, the user may select the highlight option. In this case, the user may visually highlight one or more portions of the document, such as highlighted block 820. The highlight, or color of highlight, may provide meaning to highlighted block 820. For example, the highlight might correspond to the user doing the highlighting, signify that highlighted block 820 is important or unimportant, or have some other significance. When other users later retrieve this document, the users may see the highlighting added by the user.

If the user desires to add a note to the document, the user may select the note option. In this case, the user may add a note 830 to the document or a portion of the document. Note 830 may include comments from the user, a multimedia file (audio, video, or text), or a reference (e.g., a link) to another document in memory system 130. When other users later retrieve this document, the users may be able to see note 830 added by the user.

GUI 800 may receive the information (bookmark, highlight, note) provided by the user and annotate the document accordingly onscreen. This way, the user may determine whether the information was correctly provided. GUI 800 may also send the annotated document to server 140.

Returning to FIG. 7, server 140 may receive the annotated document and send it to memory system 130 (act 720). Memory system 130 may store the annotated document in database 430 (FIG. 4) (act 730). Thereafter, when any user retrieves this document from database 430, the user gets the document with the annotation(s). This may aid the user in browsing the document, determining whether the document is one in which the user is interested, and retrieving other relevant documents. Alternatively, the document may be protected so that only the user who annotated the document may later see the annotations.

Memory system 130 may also send the annotated document to one or more of indexers 120 for retraining (act 740). Memory system 130 may send the annotated document in the form of training data. For example, memory system 130 may put the annotated document in a special form for use by indexers 120 to retrain. Alternatively, memory system 130 may send the annotated document to indexers 120, along with an instruction to retrain.

Training system 210 (FIG. 2) of indexers 120 may use the annotated document to retrain. For example, training system 210 may supplement its corpus of training data with the annotated document and generate new parameters for statistical model 220 based on the supplemented corpus of training data.

Suppose, for example, that the user provided comments within a note attached to a portion of the document. The comments may include discipline-specific words that indexers 120 cannot recognize or may include names of people, places, or companies that indexers 120 have not seen before. Indexers 120 may use the comments in recognizing future occurrences of the discipline-specific words or the names. By retraining based on annotated documents, indexers 120 improve their recognition results.

Document Attachment

FIG. 9 is a flowchart of exemplary processing for attaching documents to documents stored in memory system 130 according to an implementation consistent with the principles of the invention. Processing may begin with a user desiring to retrieve one or more documents from memory system 130. The user may use a conventional web browser of client 150 to access server 140 in a conventional manner. To obtain documents of interest, the user may generate a search query and send the query to server 140 via client 150. Server 140 may use the query to search memory system 130 and retrieve relevant documents.

Server 140 may present the relevant documents to the user (act 910). For example, the user may be presented with a list of relevant documents. The documents may include any combination of audio documents, video documents, and text documents. The user may select one or more documents on the list to view the document(s). In the case of an audio or video document, the user may be presented with a transcription of the audio data or video data corresponding to the document.

If the user desires, the user may attach a rich document to a portion of the document ("original document"). The rich document may include an audio, video, or text document relevant to that particular portion of the original document or the entire original document. For example, the rich document may be relevant to a topic contained within the original document and may describe the topic in a way that the topic is not described in the original document.

Figure 10:
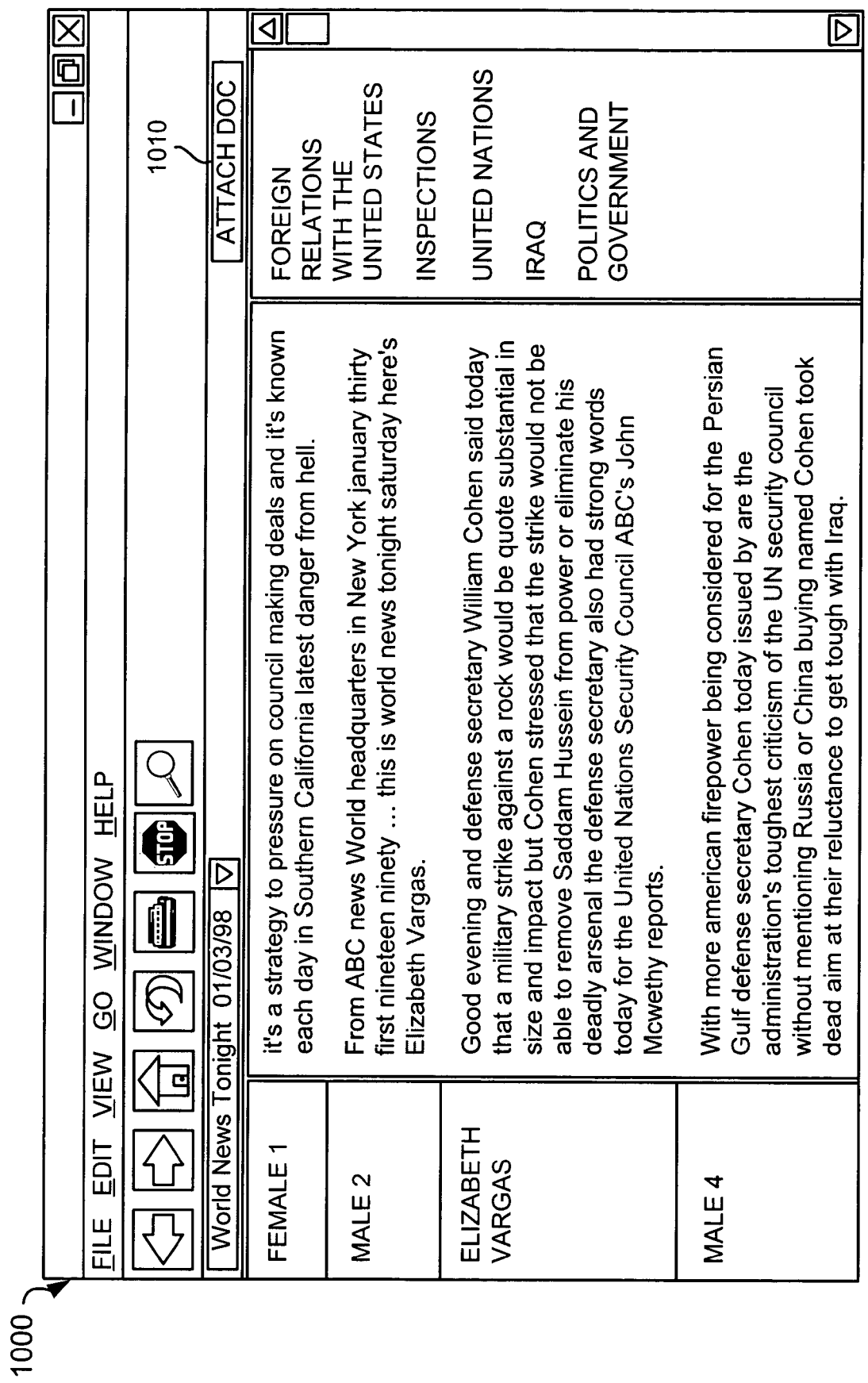
FIG. 10 is a diagram of an exemplary graphical user interface that facilitates attachment of a document according to an implementation consistent with the principles of the invention.

FIG. 10 is a diagram of an exemplary graphical user interface (GUI) 1000 that facilitates attachment of a document according to an implementation consistent with the principles of the invention. Similar to GUI 600, GUI 1000 includes a speaker section, a transcription section, and a topics section.

GUI 1000 may also include attach document button 1010. If the user desires to attach a rich document, the user may select attach document button 1010. The user may then be presented with a list of attachment options. For example, the user may cut-and-paste text of the rich document into a window of GUI 1000. Alternatively, the user may attach a file containing the rich document or provide a link to the rich document. This may be particularly useful if the rich document is an audio or video document. GUI 1000 may receive the attached document (i.e., rich document) from the user and provide the attached document to server 140.

Returning to FIG. 9, server 140 may receive and parse the attached document (act 920). Server 140 may then send it to memory system 130 (act 920). Memory system 130 may store the attached document in database 430 (FIG. 4) (act 930). Thereafter, when any user retrieves the original document from database 430, the user may also get the attached document or a link to the attached document. This may aid the user in finding documents of interest. Alternatively, the attached document may be protected so that only the user who provided the attached document may later see the attached document or the link to the attached document.

Memory system 130 may also send the attached document to one or more of indexers 120 for retraining (act 940). Memory system 130 may send the attached document in the form of training data. For example, memory system 130 may put the attached document in a special form for use by indexers 120 to retrain. Alternatively, memory system 130 may send the attached document to indexers 120, along with an instruction to retrain.

Training system 210 (FIG. 2) of indexers 120 may use the attached document to retrain. For example, training system 210 may supplement its corpus of training data with the attached document and generate new parameters for statistical model 220 based on the supplemented corpus of training data.

Training system 210 may also extract certain information from the attached document. For example, training system 210 may generate likely pronunciations for unfamiliar words or determine that certain words are names of people, places, or organizations based on their context within the document. By retraining based on attached documents, indexers 120 improve their recognition results.

Optionally, memory system 130 may also send the attached document for recognition by an appropriate one of the indexers 120 (act 950). For example, if the attached document is an audio document, memory system 130 may provide the attached document to the input of audio indexer 122 for recognition. As described above, audio indexer 122 may segment the audio document by speaker, cluster audio segments from the same speaker, identify speakers by name or gender, and transcribe the spoken words. Audio indexer 122 may also segment the audio document based on topic and locate the names of people, places, and organizations, and identify when each word was spoken (possibly based on a time value). Audio indexer 122 may then store this metadata in memory system 130.

Document Insertion

FIG. 11 is a flowchart of exemplary processing for adding new documents according to an implementation consistent with the principles of the invention. Processing may begin with a user desiring to add one or more documents to memory system 130. The user may use a conventional web browser of client 150 to access server 140 in a conventional manner to provide a new document. Alternatively, server 140 may use an agent to actively seek out new documents, such as documents from a specific folder (e.g., My Documents folder) on client 150 or documents on the Internet. In any event, the documents might include a user's personal e-mail stream, a web page, or a word processing document.

The user may provide the new document in several ways. For example, the user may cut-and-paste text of the document. Alternatively, the user may provide a file containing the document or provide a link to the document. This may be particularly useful if the document is an audio or video document.

Server 140 may receive or obtain the document (act 1110). For example, if the user provided a link to the document, then server 140 may use the link to retrieve the document using conventional techniques. Server 140 may then process the document (act 1120). For example, if the document is a web page, server 140 may parse the document and discard advertisements and other extraneous information. Server 140 may then send the document to memory system 130. Memory system 130 may store the document in database 430 (act 1130). The document may, thereafter, be available to other users.

Memory system 130 may also send the document to one or more of indexers 120 for retraining (act 1140). Memory system 130 may send the document in the form of training data. For example, memory system 130 may put the document in a special form for use by indexers 120 to retrain. Alternatively, memory system 130 may send the document to indexers 120, along with an instruction to retrain.

Training system 210 (FIG. 2) of indexers 120 may use the document to retrain. For example, training system 210 may supplement its corpus of training data with the document and generate new parameters for statistical model 220 based on the supplemented corpus of training data.

Training system 210 may also extract certain information from the document. For example, training system 210 may generate likely pronunciations for unfamiliar words or determine that certain words are names of people, places, or organizations based on their context within the document. By retraining based on new documents, indexers 120 improve their recognition results.

Optionally, memory system 130 may also send the document for recognition by an appropriate one of the indexers 120 (act 1150). For example, if the document is an audio document, memory system 130 may provide the document to the input of audio indexer 122 for recognition. As described above, audio indexer 122 may segment the audio document by speaker, cluster audio segments from the same speaker, identify speakers by name or gender, and transcribe the spoken words. Audio indexer 122 may also segment the audio document based on topic and locate the names of people, places, and organizations, and identify when each word was spoken (possibly based on a time value). Audio indexer 122 may then store this metadata in memory system 130.

CONCLUSION

Systems and methods consistent with the present invention permit users to augment a database of a multimedia recognition system by, for example, annotating, attaching, inserting, correcting, and/or enhancing documents. The systems and methods may use this user-augmentation to improve the recognition results of the recognition system. For example, the user-augmentation may be used to improve the documents stored in the database. The user-augmentation may also be used for system retraining.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, server 140 may elicit information from the user. Server 140 may ask the user to verify that a certain word corresponds to a person, place, or organization. Alternatively, server 140 may request that the user supply a document that relates to the word.

Also, exemplary graphical user interfaces have been described with regard to FIGS. 6, 8, and 10 as containing certain features in various implementations consistent with the principles of the invention. It is to be understood that a graphical user interface, consistent with the present invention, may include any or all of these features or different features to facilitate the user-augmentation.

While series of acts have been described with regard to FIGS. 5, 7, 9, and 11, the order of the acts may differ in other implementations consistent with the principles of the invention.

Further, certain portions of the invention have been described as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A multimedia recognition system, comprising:
a plurality of indexers configured to: receive multimedia data, and analyze the multimedia data based on training data to generate a plurality of documents; and
a memory system configured to: store the documents from the indexers, receive user augmentation relating to one of the documents, and provide the user augmentation to one or more of the indexers for retraining based on the user augmentation, wherein when receiving user augmentation relating to one of the documents, the memory system is configured to: receive correction of the one of the documents, as a corrected document, from a user, and store the corrected document.

2. The system of claim 1, wherein when providing the user augmentation to one or more of the indexers, the memory system is configured to send the corrected document to the one or more of the indexers for retraining based on the corrected document.

3. The system of claim 2, wherein the one or more of the indexers are configured to:
add the corrected document to the training data, and
retrain based on the training data.

4. A multimedia recognition system, comprising:
a plurality of indexers configured to: receive multimedia data, and analyze the multimedia data based on training data to generate a plurality of documents; and
a memory system configured to: store the documents from the indexers, receive user augmentation relating to one of the documents, and provide the user augmentation to one or more of the indexers for retraining based on the user augmentation, wherein when receiving user augmentation relating to one of the documents, the memory system is configured to: receive enhancement of the one of the documents, as an enhanced document, from a user, and store the enhanced document.

5. The system of claim 4, wherein when providing the user augmentation to one or more of the indexers, the memory system is configured to send the enhanced document to the one or more of the indexers for retraining based on the enhanced document.

6. The system of claim 5, wherein the one or more of the indexers are configured to:
add the enhanced document to the training data, and
retrain based on the training data.

7. A multimedia recognition system, comprising:
a plurality of indexers configured to: receive multimedia data, and analyze the multimedia data based on training data to generate a plurality of documents; and
a memory system configured to: store the documents from the indexers, receive user augmentation relating to one of the documents, and provide the user augmentation to one or more of the indexers for retraining based on the user augmentation, wherein when receiving user augmentation relating to one of the documents, the memory system is configured to: receive annotation of the one of the documents, as an annotated document, from a user, and store the annotated document.

8. The system of claim 7, wherein when providing the user augmentation to one or more of the indexers, the memory system is configured to send the annotated document to the one or more of the indexers for retraining based on the annotated document.

9. The system of claim 8, wherein the one or more of the indexers are configured to:
add the annotated document to the training data, and
retrain based on the training data.

10. The system of claim 7, wherein when receiving annotation of the one of the documents, the memory system is configured to at least one of: receive a bookmark relating to the one of the documents, receive highlighting regarding one or more portions of the one of the documents, and receive a note relating to at least a portion of the one of the documents.

11. The system of claim 10, wherein the note includes one of comments from the user, one of an audio, video, and text file, and a reference to another one of the documents.

12. A multimedia recognition system, comprising:
a plurality of indexers configured to: receive multimedia data, and analyze the multimedia data based on training data to generate a plurality of documents; and
a memory system configured to: store the documents from the indexers, receive user augmentation relating to one of the documents, and provide the user augmentation to one or more of the indexers for retraining based on the user augmentation, wherein when receiving user augmentation relating to one of the documents, the memory system is configured to: receive an attachment for the one of the documents from a user, and store the attachment.

13. The system of claim 12, wherein when providing the user augmentation to one or more of the indexers, the memory system is configured to send the attachment to the one or more of the indexers for retraining based on the attachment.

14. The system of claim 13, wherein the one or more of the indexers are configured to:
add the attachment to the training data, and retrain based on the training data.

15. The system of claim 12, wherein the attachment includes one of an audio document, a video document, and a text document, or a reference to the audio document, the video document, or the text document.

16. The system of claim 12, wherein the memory system is further configured to: send the attachment for analysis by one or more of the indexers.

17. A method for improving recognition results, comprising:
receiving multimedia data; recognizing the multimedia data based on training data to generate a plurality of documents;
receiving user augmentation relating to one of the documents, wherein the receiving user augmentation relating to one of the documents includes: receiving correction of the one of the documents, as a corrected document, from a user, and storing the corrected document;
supplementing the training data with the user augmentation to obtain supplemented training data; and
retraining based on the supplemented training data.

18. The method of claim 17, wherein the supplementing the training data includes: adding the corrected document to the training data.

19. A method for improving recognition results, comprising:
receiving multimedia data; recognizing the multimedia data based on training data to generate a plurality of documents;
receiving user augmentation relating to one of the documents wherein the receiving user augmentation relating to one of the documents includes: receiving enhancement of the one of the documents, as an enhanced document, from a user, and storing the enhanced document;
supplementing the training data with the user augmentation to obtain supplemented training data; and
retraining based on the supplemented training data.

20. The method of claim 19, wherein the supplementing the training data includes:
adding the enhanced document to the training data.

21. A method for improving recognition results, comprising:
receiving multimedia data; recognizing the multimedia data based on training data to generate a plurality of documents;
receiving user augmentation relating to one of the documents wherein the receiving user augmentation relating to one of the documents includes receiving annotation of the one of the documents, as an annotated document, from a user, and storing the annotated document;
supplementing the training data with the user augmentation to obtain supplemented training data; and
retraining based on the supplemented training data.

22. The method of claim 21, wherein the supplementing the training data includes:
adding the annotated document to the training data.

23. The method of claim 21, wherein the receiving annotation of the one of the documents includes at least one of: receiving a bookmark relating to the one of the documents, receiving highlighting regarding one or more portions of the one of the documents, and receiving a note relating to at least a portion of the one of the documents.

24. The method of claim 23, wherein the note includes one of comments from the user, one of an audio, video, and text file, and a reference to another one of the documents.

25. A method for improving recognition results, comprising:
receiving multimedia data; recognizing the multimedia data based on training data to generate a plurality of documents;
receiving user augmentation relating to one of the documents wherein the receiving user augmentation relating to one of the documents includes receiving an attachment for the one of the documents from a user, and storing the attachment;
supplementing the training data with the user augmentation to obtain supplemented training data; and
retraining based on the supplemented training data.

26. The method of claim 25, wherein the supplementing the training data includes:
adding the attachment to the training data.

27. The method of claim 25, wherein the attachment includes one of an audio document, a video document, and a text document, or a reference to the audio document, the video document, or the text document.

28. A multimedia recognition system, comprising:
a plurality of indexers configured to:
receive multimedia data, and analyze the multimedia data based on training data to generate a plurality of documents; and
a memory system configured to: store the documents from the indexers, obtain new documents, store the new documents, and provide the new documents to one or more of the indexers for retraining based on the new documents, wherein when obtaining one of the new documents, the memory system is configured to at least one of: receive text that has been cut-and-pasted, receive a file containing the one of the new documents, receive a link to the one of the new documents and employ an agent to actively seek out and retrieve new documents.

29. The system of claim 28, wherein the one or more of the indexers are configured to: add the new documents to the training data, and retrain based on the training data.

30. A method for improving recognition results, comprising:
- receiving multimedia data;
- recognizing the multimedia data based on training data to generate a plurality of documents;
- obtaining new documents, wherein the obtaining new documents includes at least one of receiving text that has been cut-and-pasted, receiving one or more files containing the new documents, receiving one or more links to-the new documents and actively seeking out and retrieving the new documents;
- supplementing the training data with the new documents to obtain supplemented training data; and
- retraining based on the supplemented training data.

* * * * *